United States Patent [19]

Hsieh

[11] Patent Number: 5,533,091
[45] Date of Patent: Jul. 2, 1996

[54] NOISE SUPPRESSION ALGORITHM AND SYSTEM

[75] Inventor: Jiang Hsieh, Waukesha, Wis.

[73] Assignee: General Electric Company, Milwaukee, Wis.

[21] Appl. No.: 430,435

[22] Filed: Apr. 28, 1995

[51] Int. Cl.⁶ .................................................. G06F 15/00
[52] U.S. Cl. ..................... 378/210; 378/901; 364/413.17
[58] Field of Search ................................. 378/210, 901, 378/4; 364/413.17, 413.16

[56] References Cited

U.S. PATENT DOCUMENTS

| | | |
|---|---|---|
| 4,274,140 | 6/1981 | Watson .............................. 364/413.18 |
| 4,275,444 | 6/1981 | Ryan ................................. 364/413.17 |
| 4,682,291 | 7/1987 | Reuveni . |
| 4,755,954 | 7/1988 | Netter . |
| 4,768,216 | 8/1988 | Harvey et al. . |
| 4,914,589 | 4/1990 | Crawford . |
| 5,132,999 | 7/1992 | Wirth . |
| 5,159,697 | 10/1992 | Wirth . |
| 5,249,123 | 9/1993 | Hsieh . |
| 5,265,013 | 11/1993 | King et al. . |
| 5,293,195 | 3/1994 | Berlad et al. . |
| 5,461,655 | 10/1995 | Vuylsteke et al. ....................... 378/62 |

OTHER PUBLICATIONS

L. L. Berland, Practical CT, Technology and Techniques, Raven Press, New York, 1986, p. 176.

A. Papoulis, Probability, Random Variables, and Stochastic Processes, McGraw-Hill, New York, 1984, p. 113.

U.S. Patent Application Serial No. 08/087,568, Adaptive Filter For Reducing Streaking Artifacts in X-ray Tomographic Images, Filed Jul 2, 1993.

*Primary Examiner*—David P. Porta
*Attorney, Agent, or Firm*—John S. Beulick; John H. Pilarski

[57] ABSTRACT

A method and system for suppressing artifacts in a CT generated image are described. With respect to artifacts resulting from X-ray beam photon starvation conditions, and in accordance with one embodiment of the method, the steps of determining a minimum value X-ray beam flux for a projection data set and dynamically DC adjusting the projection data based on the determined minimum X-ray beam flux are performed.

20 Claims, 4 Drawing Sheets

1

NOISE SUPPRESSION ALGORITHM AND SYSTEM

FIELD OF THE INVENTION

This invention relates generally to computed tomography (CT) imaging and more particularly, to performing dynamic DC adjustment for noise suppression in a CT system.

BACKGROUND OF THE INVENTION

In CT systems, an x-ray source projects a fan-shaped beam which is collimated to lie within an X-Y plane of a Cartesian coordinate system, termed the "imaging plane". The x-ray beam passes through the object being imaged, such as a patient, and impinges upon a linear array of radiation detectors. The intensity of the transmitted radiation is dependent upon the attenuation of the x-ray beam by the object. Each detector of the linear array produces a separate electrical signal that is a measurement of the beam attenuation. The attenuation measurements from all the detectors are acquired separately to produce a transmission profile.

The x-ray source and the linear detector array in a CT system are rotated with a gantry within the imaging plane and around the object so that the angle at which the x-ray beam intersects the object constantly changes. A group of x-ray attenuation measurements from the detector array at one gantry angle is referred to as a "view". A "scan" of the object comprises a set of views made at different gantry angles during one revolution of the x-ray source and detector.

In an axial scan, signals from the detector array are processed to construct an image that corresponds to a two dimensional slice taken through the object. Such processing is sometimes referred to as image reconstruction. One image reconstruction method is referred to as the filtered back projection process. This process converts the attenuation measurements from a scan into integers called "CT numbers" or "Hounsfield units", which are used to control the brightness of a corresponding pixel on a cathode ray tube display.

Reducing image artifacts in CT generated images, of course, is desirable. Such artifacts are generated for different reasons such as, for example, if the attenuated X-ray beam at the detectors is weak. Such a condition is known as X-ray photon starvation. Since X-ray photons are absorbed by the human body, the strength (or magnitude) of the X-ray beam is reduced as the beam travels through the body. Accordingly, X-ray photon starvation occurs most often when the X-ray beam must travel through a lengthy region of a patient's body.

Two types of artifacts are commonly associated with X-ray photon starvation conditions. One artifact type is known as "shading" which results from CT number shifts. Such a significant difference in the CT numbers results in the image appearing darker, or shaded. The other artifact type associated with X-ray photon starvation is a severe streaking artifact which appears between two highly attenuating objects. In many cases, if X-ray photon starvation conditions are present, the artifacts are so severe that the images have to be discarded.

To reduce the occurrence of the artifacts resulting from X-ray photon starvation, CT technicians are trained to select proper X-ray source operations (kV, mA) and slice thickness for different patient sizes. In addition, patients are instructed to place their arms outside the scanning field of view (FOV) to reduce any unnecessary photon absorption by the arms.

In many cases, however, the X-ray tube specifications or other limitations prevent optimization of the X-ray source operation. Also, due to the many variations in patient anatomy, using different scanning techniques for different body types and regions can be very time consuming. Using such time consuming techniques reduces patient throughput, which is undesirable. Furthermore, even when such techniques are attempted to be practiced, some patients are uncooperative. For example, instructions such as "hold your arms over your head" may be ignored by some patients.

Adaptive filtering techniques also have been proposed to correct projection data for any X-ray photon starvation artifacts. With these techniques, a "smoothing" operation, adapted based on the X-ray photon flux in the projection, is performed. "Smoothing" operations generally involve adjusting the signal detected at one channel based on the detected signal magnitude at the channel and the magnitudes of the detected signals of adjacent channels. Such "smoothing" is performed on a channel by channel basis to eliminate shading and streaking type artifacts. Since only a small percent of projection readings experiences X-ray photon starvation, the impact of such smoothing operations on system resolution is minimal. Executing such smoothing operations, however, requires extensive computation. As a result, adaptive filtering techniques have not been widely used since implementing such techniques increases system costs.

There exists a need to cost effectively eliminate artifacts generated due to photon starvation conditions. Eliminating such artifacts, however, should not require using different scanning techniques for different body regions nor rely upon patient cooperation.

SUMMARY OF THE INVENTION

The present invention, in one form, is an algorithm for substantially eliminating artifacts due to X-ray photon starvation conditions. More particularly, the algorithm includes the step of determining, for each set of projection data corresponding to a view, the minimum, or lowest, photon count or flux of any channel. Each view, for example, is composed of data from eight hundred and fifty two channels. Each channel corresponds to one detector of the detector array. The magnitudes of the signals from the detectors are compared to identify the lowest magnitude signal.

Once the minimum photon count is determined, the projection data is calibrated. Such calibration includes "air" calibration for any channel-to-channel variations resulting from detector channel-to-channel gain difference and "reference" calibration to eliminate any signal variation due to X-ray tube output fluctuations.

After such calibration, a dynamic DC adjustment is made to the calibrated projection data. For each set of projection data, i.e., for each view, the magnitude of the DC adjustment to each data element is a constant. The magnitude of the DC adjustment varies, however, from view to view. The DC adjustment magnitude for each view is sufficient to effectively reduce X-ray photon starvation artifacts but is maintained at a minimum so as to limit any bias which may be added to the image. In addition, the magnitude of the DC adjustment is modulated by the projection angle to further minimize the bias effect. Once the projection data has been dynamically adjusted as explained above, the the "minus log" operation and other calibration operations may be performed.

By making the dynamic DC adjustment as described above, artifacts which may otherwise be present due to X-ray photon starvation are substantially eliminated. Such artifacts are substantially eliminated without requiring use of different scanning techniques for different body regions and without requiring patient cooperation beyond that presently required.

DETAILED DESCRIPTION OF THE DRAWINGS

Figure 1:
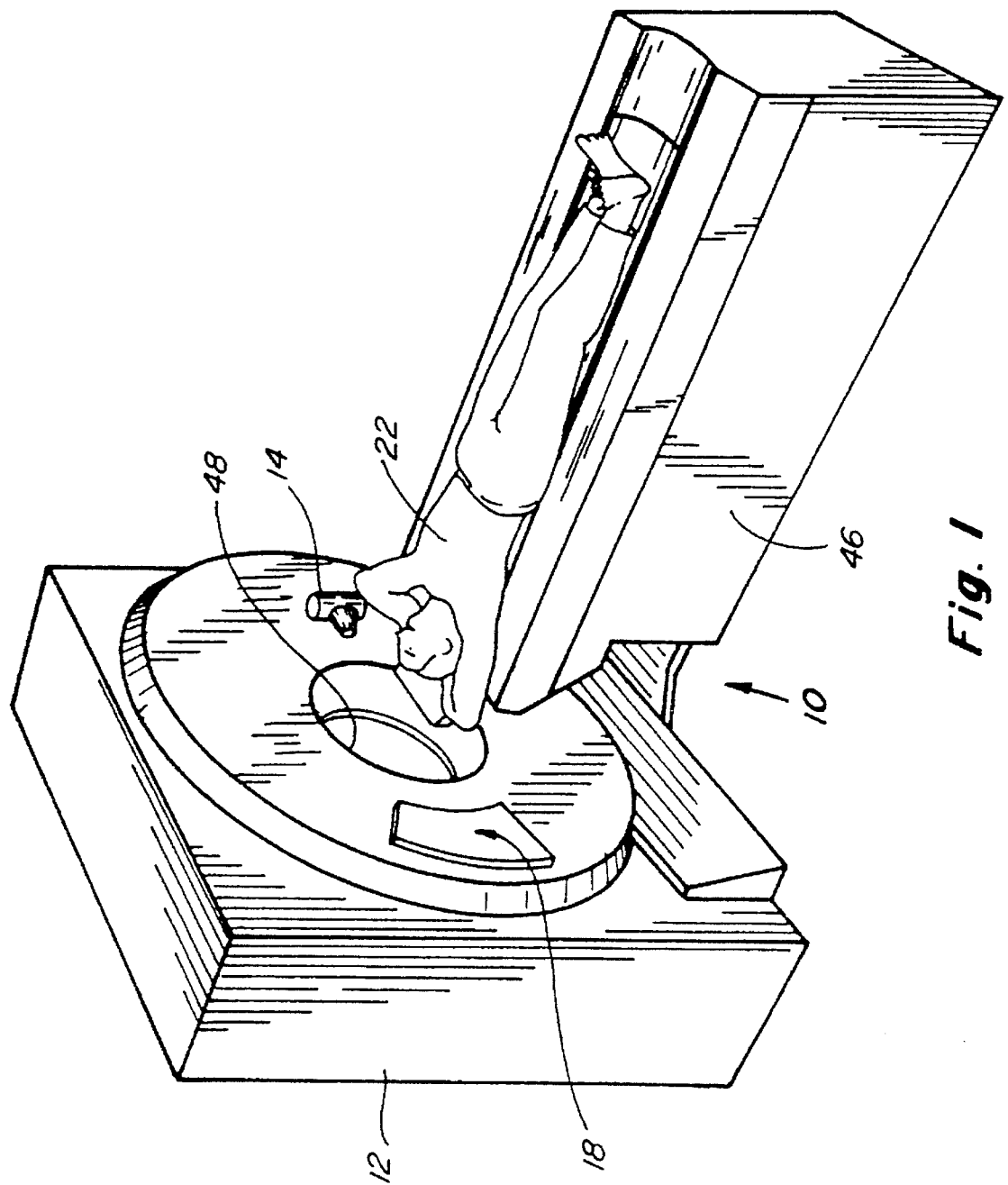
FIG. 1 is a pictorial view of a CT imaging system.
Figure 2:
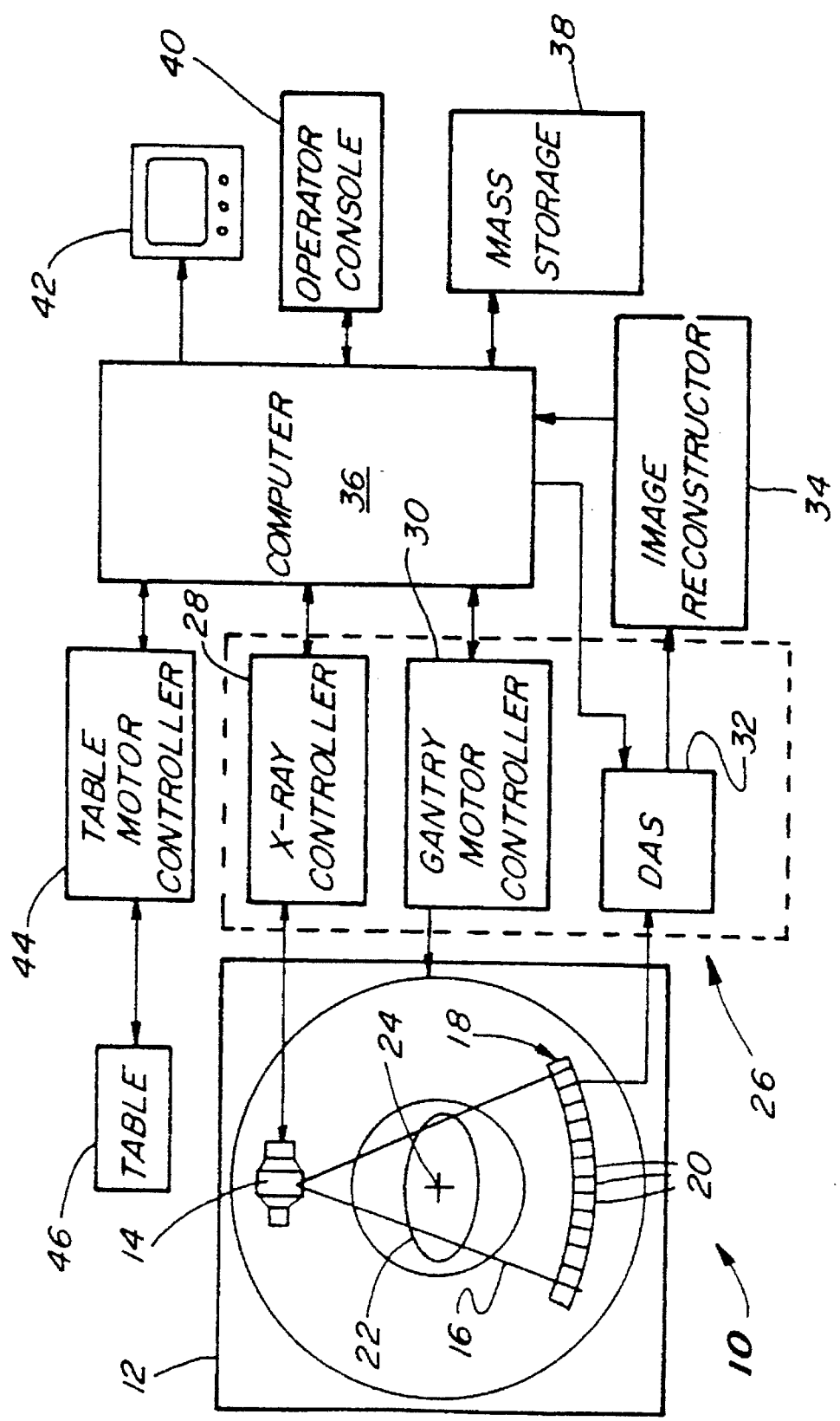
FIG. 2 is a block schematic diagram of the system illustrated in FIG. 1.

With reference to FIGS. 1 and 2, a computed tomography (CT) imaging system 10 includes a gantry, 12 representative of a "third generation" CT scanner. Gantry 12 has an X-ray source 14 that projects a beam of X-rays 16 toward a detector array 18 on the opposite side of gantry 12. Detector array 18 is formed by detector elements 20 which together sense the projected X-rays that pass through a medical patient 22. Each detector element 20 produces an electrical signal that represents the intensity of an impinging X-ray beam and hence the attenuation of the beam as it passes through patient 22. During a scan to acquire X-ray projection data, gantry 12 and the components mounted thereon rotate about a center of rotation 24.

Rotation of gantry 12 and the operation of X-ray source 14 are governed by a control mechanism 26 of CT system 10. Control mechanism 26 includes an X-ray controller 28 that provides power and timing signals to X-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized X-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, X-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

In converting raw data collected from detector elements 20 to image data for display on display 42, a number of operations including calibration and correction algorithms are executed. Specifically, the raw data is digitized by DAS 32 to form digitized projection data. The project data is then calibrated and filtered by image reconstructor 34 to form image data. As a result of such calibration and correction, a high resolution image with very few, if any, artifacts, should be generated from the image data.

Artifacts which result from X-ray photon starvation should be substantially eliminated from the projection data during the image reconstruction process. As hereinbefore described, such starvation occurs when the X-ray photon flux at a detector element 20 approaches zero. The attenuation representative signal output from such detector element 20 will be extremely low, and possibly even negative.

When a detector output signal is dominated by the X-ray photon noise component, the variance of the detector output signal is proportional to the measured signal, i.e., the photon detection component. By denoting $\gamma$ as the measured value, i.e., the magnitude of the photon detection component, the detector output signal variance is represented as:

$$\sigma^2 = \gamma. \tag{1}$$

Ignoring the "minus logarithm" calibration step, which generally involves identifying the absolute logarithmic values of the projection data to eliminate any negative detector signals, the effect of performing calibration processing can be approximated, to the first order, by:

$$\sigma^2_y = k\gamma \tag{2}$$

where k is a scaling factor. This follows from the fact that the first order estimation of the variance of a random variable $y = g(\gamma)$ is:

$$\sigma^2_y = |g(\gamma)|^2 \sigma^2. \tag{3}$$

The effect of the minus logarithm calibration on variance is:

$$\sigma^2_z = \sigma^2_y/\gamma^2 = k/\gamma. \tag{4}$$

This relationship indicates that the variance of the processed projection data, i.e., the line integral of the attenuation coefficient, is inversely proportional to the measured X-ray photon flux. Therefore, when the X-ray photon flux approaches zero, i.e., X-ray photon starvation, the variance becomes extremely large. By reducing such variance, a higher resolution image may be generated.

As explained above, under X-ray photon starvation conditions, a detector output signal may be negative. Such negativity of the signal is caused, for example, by drift of system 10 electronics. Since the offset drift is a global phenomenon that should affect every detector channel uniformly, a positive bias can be added to the entire projection data set when negative signals, or extremely low magnitude signals, are detected.

Adding such a positive bias to an entire projection data set, i.e., to each channel signal which composes a view, is referred to herein as DC adjustment. DC adjustment is performed by adding a constant to each data element of a projection data set. Although this constant does not change from channel to channel within each view, i.e., within each projection data set, the constant is modulated from view to view. Such modulation of the constant is referred to herein as "dynamic adjustment".

Figure 3:
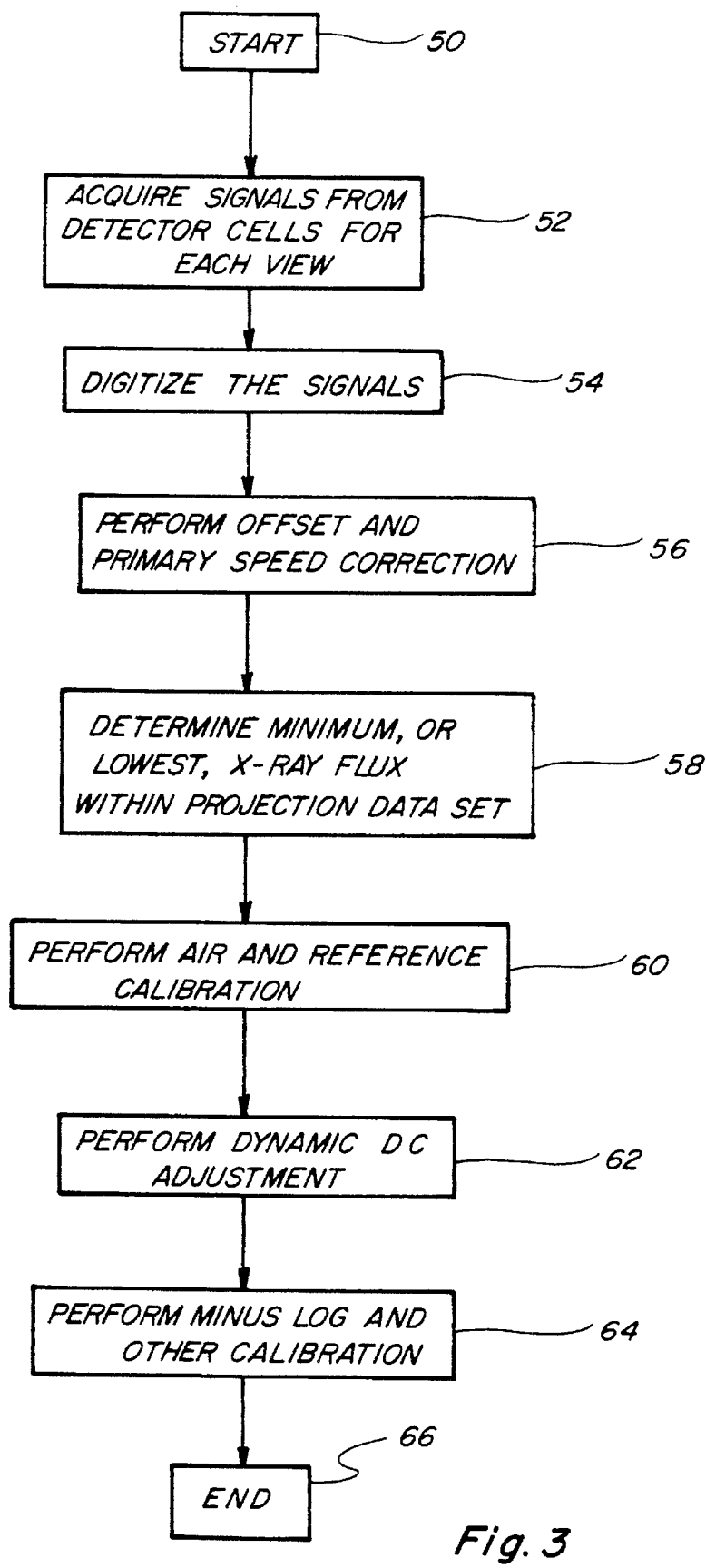
FIG. 3 is a flow chart illustrating a sequence of process steps in connection with dynamic DC adjustment.

FIG. 3 illustrates a sequence of process steps which may be followed in connection with making such a dynamic DC adjustment. Particularly, once operations are started as indicated at step 50, signals are acquired by DAS 32 from each detector element 20 at step 52. Each detector element signal is then digitized 54 by DAS 32.

The digitized projection data is supplied by DAS 32 to image reconstructor 34, and all the following described steps are performed by reconstructor 34. Particularly, offset calibration and primary speed calibration 56 are performed in order to eliminate, from the digitized projection data, any bias due to drift of system 10 components and to correct for any errors due to detector 20 characteristics.

The minimum, or lowest, X-ray flux detected by an detector for each set of projection data is then determined 58. Each view, for example, is composed of data from eight hundred and fifty two channels. Each channel corresponds to one detector 20 of detector array 18. The data elements corresponding to each channel signal and for each projection data set can simply be compared to identify the lowest value data element. For each projection data set, the value of the lowest value data element in such set is the minimum X-ray flux for that set of projection data.

In general, the minimum flux should be determined at a point in the image reconstruction process in which the projection data represents the true X-ray flux. Therefore, the minimum flux does not necessarily have to be determined immediately after performing offset and primary speed correction 56. Such minimum flux determination, however, preferably is performed prior to the "minus log" operation.

Rather than using a minimum flux, of course, other values such as an average minimum flux can be used. An average flux minimum can be determined by averaging the value of several lowest value data elements or the lowest average of several data elements representing the signals from neighboring channels.

Once the value of the minimum flux $\zeta$ is obtained for a particular view, additional calibration such as "air" and "reference" calibration can be performed 60. "Air" calibration corrects the projection data for any channel-to-channel variations resulting from detector channel-to-channel gain variation and "reference" calibration eliminates any signal variation due to X-ray tube output fluctuation.

The minimum flux determined in the previous steps can be further processed (e.g., recursive filtering along view direction) to reduce the view to view fluctuation. In addition, a non-linear mapping process is performed to map from the minimum flux reading to the DC shift magnitude. Recursive filtering is used mainly for a speed advantage. Other filtering schemes can also be used. The impact of recursive filtering on the minimum flux is:

$$\zeta_k = a(\zeta_k - b) + (1-a)\zeta_{k-1} \quad (5)$$

where $\zeta_k$ is the minimum flux for view number k and a and b are parameters. If $\zeta$ is larger than 0, it is set to 0.

After performing such operations, dynamic DC adjustment 62 of the projection data is performed. Such dynamic DC adjustment is performed in accordance with the following equation:

$$P_k = P_k - \zeta_k \gamma w_k \quad (6)$$

where $\gamma$ is a scaling factor and $w_k$ is a weighting factor. $P_k$ represents the view number k. Since there are many channels in a view (roughly 852), $P_k$ is a vector.

Figure 4:
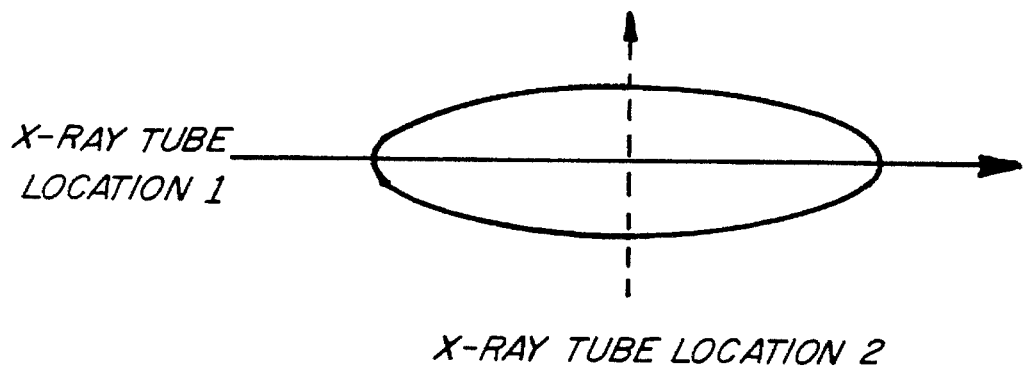
FIG. 4 is a representation of X-ray beam scan angles.

With respect to the weighting factor $w_k$, FIG. 4 illustrates the angular dependency of the DC adjustment. Such weighting factor $w_k$ is utilized in view of the that in most instances, streaks are generated in the image data for the shoulder and pelvis areas of a patient. In both areas, the object to be imaged is longer from left to right than front to back. In addition, when performing a CT scan, the dense bone structures are aligned in the left to right position. As a result, and referring specifically to FIG. 4, the X-ray flux of the attenuated X-ray beam when X-ray source 14 is at location 1 (after passing through the patient) is much smaller than such flux when X-ray source 14 is at location 2. Therefore, the amount of DC adjustment to the projection data is modulated as a function of the view angle (e.g., 0 degrees is when X-ray tube is at 12 o'clock position).

Figure 5:
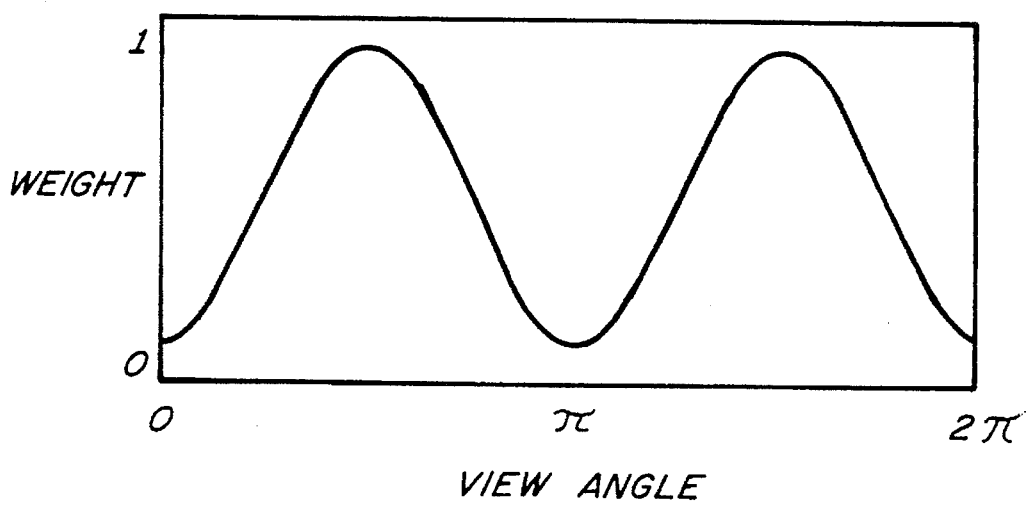
FIG. 5 is an example of a weighting function.

An example of a weighting function $w_k$ to achieve such modulation is shown in FIG. 5. The weights can be described as:

$$w(\alpha) = \beta + (1-\beta) \sin(2\alpha + 1.5\pi) \quad (7)$$

where $\alpha$ is the view angle and $\beta$ is a parameter that controls the dynamic range of weights. Many other weighting functions, of course, could be used.

To further minimize the signal variation, a stationary filter operation can be performed after performing the above-described dynamic DC adjustment 62. The filter is applied only when $\zeta_k$ is below certain threshold.

The variance in the projection after this operation is:

$$\sigma^2_z \approx \sigma^2_y / (\gamma + c)^2 \approx k\gamma/(\gamma + c)^2 > k/\gamma \quad (8)$$

There is a drawback, however, with the simple DC adjustment. Since it is performed before the minus logarithm operation, an error will be introduced to the projection. The error in general will increase with the amount of DC adjustment placed in the scan data. Therefore, the DC adjustment should be used only when necessary, e.g., when the number of X-ray photon starvation artifacts exceeds some predetermined threshold. In addition, the amount of the DC adjustment should be kept to a minimum. The error due to the adjustment, however, is channel dependent and is low frequency in nature. Therefore, the error will be further compressed in the convolution filtering operation during the tomographic reconstruction process.

Once the projection data is dynamically DC adjusted 62, a "minus log" and other calibration operations 64 may be performed on such data. The processed projection data can then be fed through other preprocessing and reconstruction steps to arrive at a reconstructed image 66.

Processing steps 52–54, 60 and 64 are well known in the art. By using the above-described dynamic DC adjustment in combination with such steps, artifacts which may otherwise be present due to X-ray photon starvation are substantially eliminated. Importantly, such artifacts are substantially eliminated without requiring use of different scanning techniques for different body regions and without requiring patient cooperation beyond that presently required.

From the preceding description of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for generating an image from projection data obtained in a CT scan, the projection data being collected in projection data sets, each projection data set corresponding to one view, said method comprising the steps of:

determining a minimum value X-ray beam flux for a projection data set for a view; and adjusting the projection data of the projection data set in accordance with the following:

$$P_k = P_k - \zeta_k \gamma w_k$$

where $\zeta_k$ is a function of minimum flux, $\gamma$ is a scaling factor, $w_k$ is a weighting factor and $P_k$ represents the view number k.

2. A method in accordance with claim 1 wherein prior to determining the minimum X-ray beam flux, the projection data set is digitized and offset calibration and primary speed calibration are performed on the projection data.

3. A method in accordance with claim 1 wherein the minimum value X-ray beam flux is determined by comparing the value of the data elements of the projection data set to identify the lowest value data element.

4. A method in accordance with claim 1 wherein the minimum value X-ray beam flux is determined from the projection data which represents the true X-ray beam flux.

5. A method in accordance with claim 1 wherein the minimum value X-ray beam flux is determined by averaging the value of selected lowest value data elements of the projection data set.

6. A method in accordance with claim 1 wherein the minimum value X-ray beam flux is determined by averaging the value of data elements representing the signals from neighboring channels.

7. A method in accordance with claim 1 wherein after determining the minimum flux air and reference calibration operations are performed on the projection data.

8. A method in accordance with claim 7 wherein recursive filtering is performed after performing the air and reference calibration operations.

9. A method in accordance with claim 1 wherein the function of minimum flux $\zeta_k$ is:

$$\zeta_k = a(\zeta_k - b) = (1-a)\zeta_{k-1}$$

where $\zeta_k$ is the minimum flux for view number k, a and b are parameters, and if $\zeta_k$ is larger than 0, it is set to 0.

10. A method in accordance with claim 1 wherein the weighting function $w_k$ is:

$$w(\alpha) = \beta + (1-\beta) \sin(2\alpha + 1.5\pi)$$

where $\alpha$ is the view angle and $\beta$ is a parameter that controls the dynamic range of weights.

11. A computed tomography system for generating an image from projection data obtained from performing a scan, the projection data being collected in projection data sets, each projection data set corresponding to one view, said system being configured to:

determine a minimum value X-ray beam flux for a projection data set for a view; and adjust the projection data of the projection data set in accordance with the following:

$$P_k = P_k - \zeta_k \gamma w_k$$

where $\zeta_k$ is a function of minimum flux, $\gamma$ is a scaling factor, $w_k$ is a weighting factor and $P_k$ represents the view number k.

12. A system in accordance with claim 11 further comprising an X-ray source and a detector array mounted on a rotatably gantry, said system further comprising a data acquisition system coupled to said detector array for digitizing projection data signals output from said detector array.

13. A system in accordance with claim 11 wherein the minimum value X-ray beam flux is determined by comparing the value of the data elements of the projection data set to identify the lowest value data element.

14. A system in accordance with claim 11 wherein the function of minimum flux $\zeta_k$ is:

$$\zeta_k = a(\zeta_k - b) + (1-a)\zeta_{k-1}$$

where $\zeta_k$ is the minimum flux for view number k, a and b are parameters, and if $\zeta_k$ is larger than 0, it is set to 0.

15. A system in accordance with claim 11 wherein the weighting function $w_k$ is:

$$w(\alpha) = \beta + (1-\beta) \sin(2\alpha + 1.5\pi)$$

where $\alpha$ is the view angle and $\beta$ is a parameter that controls the dynamic range of weights.

16. Apparatus for generating an image from projection data obtained from performing an X-ray beam scan, the projection data being collected in projection data sets, each projection data set corresponding to one view, said apparatus comprising:

means for determining a minimum value X-ray beam flux for a projection data set for a view; and means for adjust the projection data of the projection data set in accordance with the following:

$$P_k = P_k - \zeta_k \gamma w_k$$

where $\zeta_k$ is a function of minimum flux, $\gamma$ is a scaling factor, $w_k$ is a weighting factor and $P_k$ represents the view number k.

17. Apparatus in accordance with claim 16 further comprising an X-ray source and a detector array mounted on a rotatably gantry, said apparatus further comprising a data acquisition system coupled to said detector array for digitizing projection data signals output from said detector array.

18. Apparatus in accordance with claim 16 wherein said means for determining minimum value X-ray beam flux comprises means for comparing the value of the data elements of the projection data set to identify the lowest value data element.

19. Apparatus in accordance with claim 16 wherein the function of minimum flux $\zeta_k$ is:

$$\zeta\text{hd }k = a(\zeta_k - b) + (1-a)\zeta_{k-1}$$

where $\zeta_k$ is the minimum flux for view number k, a and b are parameters, and if $\zeta_k$ is larger than 0, it is set to 0.

20. Apparatus in accordance with claim 16 wherein the weighting function $w_k$ is:

$$w(\alpha) = \beta + (1-\beta) \sin(2\beta + 1.5\pi)$$

where $\alpha$ is the view angle and $\beta$ is a parameter that controls the dynamic range of weights.

* * * * *